United States Patent
Kanno et al.

(10) Patent No.: US 10,741,299 B2
(45) Date of Patent: Aug. 11, 2020

(54) SOLID α-LITHIUM ELECTROLYTE (71) Applicants: TOKYO INSTITUTE OF TECHNOLOGY, Tokyo (JP); TOYOTA JIDOSHA KABUSHIKI KAISHA, Toyota-shi, Aichi-ken (JP)

(72) Inventors: Ryoji Kanno, Tokyo (JP); Satoshi Hori, Tokyo (JP)

(73) Assignees: Tokyo Insititute of Technology, Meguro-ku, Tokyo (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/749,457

(22) PCT Filed: Jul. 15, 2016

(86) PCT No.: PCT/JP2016/071066
§ 371 (c)(1),
(2) Date: Jan. 31, 2018

(87) PCT Pub. No.: WO2017/022464
PCT Pub. Date: Feb. 9, 2017

(65) Prior Publication Data
US 2018/0226171 A1 Aug. 9, 2018

(30) Foreign Application Priority Data
Jul. 31, 2015 (JP) .................................. 2015-152634

(51) Int. Cl.
*H01B 1/10* (2006.01)
*C01B 25/14* (2006.01)
(Continued)

(52) U.S. Cl.
CPC ............... *H01B 1/10* (2013.01); *C01B 25/14* (2013.01); *H01B 1/06* (2013.01); *H01M 4/62* (2013.01);
(Continued)

(58) Field of Classification Search
CPC .. H01M 4/62; H01M 10/052; H01M 10/0562; H01B 1/10; H01B 25/14
See application file for complete search history.

(56) References Cited

U.S. PATENT DOCUMENTS

2006/0127772 A1* 6/2006 Ota ..................... H01M 4/0421
429/231.95
2007/0160911 A1 7/2007 Senga et al.
(Continued)

FOREIGN PATENT DOCUMENTS

| CN | 103003890 A | 3/2013 |
| CN | 103999279 A | 8/2014 |

(Continued)

OTHER PUBLICATIONS

International Search Report dated Oct. 18, 2016, dated Oct. 18, 2016, in corresponding International Application No. PCT/JP2016/071066; 2 pages.
(Continued)

Primary Examiner — Jimmy Vo
(74) Attorney, Agent, or Firm — Finnegan, Henderson, Farabow, Garrett & Dunner, LLP (57) ABSTRACT

(Problem to be Solved) The present invention was made in view of the above-described problems, with an object of providing a Li—P—S-based sulfide solid electrolyte material with both excellent electrochemical stability and a high lithium ion conductivity, providing a method of producing the Li—P—S-based sulfide solid electrolyte material, and providing a lithium battery including the sulfide solid electrolyte material.

(Continued)

(Solution) There is provided a sulfide solid electrolyte material including a Li element, a P element, and a S element and having peaks at positions of $2\theta=17.90\pm0.20$, $29.0\pm0.50$, and $29.75\pm0.25'$ in powder X-ray diffraction measurement using a Cu-Kα ray having an X-ray wavelength of 1.5418 Å, in which assuming that the diffraction intensity of the peak at $2\theta=17.90\pm0.20$ is $I_A$ and the diffraction intensity of the peak at $2\theta=18.50\pm0.20$ is $I_B$, a value of $I_B/I_A$ is less than 0.50.

7 Claims, 8 Drawing Sheets

(51) Int. Cl.
    *H01M 10/052*     (2010.01)
    *H01M 10/0562*     (2010.01)
    *H01B 1/06*     (2006.01)
    *H01M 4/62*     (2006.01)

(52) U.S. Cl.
    CPC ..... *H01M 10/052* (2013.01); *H01M 10/0562* (2013.01); *H01M 2300/0068* (2013.01)

(56) References Cited

U.S. PATENT DOCUMENTS

| | | | |
|---|---|---|---|
| 2012/0301796 | A1 | 11/2012 | Ohtomo et al. |
| 2013/0040208 | A1* | 2/2013 | Kanno .................... C01B 17/20 |
| | | | 429/319 |
| 2013/0164631 | A1* | 6/2013 | Ohtomo ............ H01M 10/0525 |
| | | | 429/319 |
| 2013/0164632 | A1 | 6/2013 | Kato et al. |
| 2014/0302382 | A1 | 10/2014 | Kambara et al. |
| 2014/0363745 | A1 | 12/2014 | Hirayama et al. |
| 2015/0037687 | A1 | 2/2015 | Kanno et al. |
| 2015/0147597 | A1 | 5/2015 | Otomo et al. |
| 2015/0357673 | A1 | 12/2015 | Kanno et al. |
| 2016/0068630 | A1 | 3/2016 | Carpentier et al. |
| 2016/0149258 | A1 | 5/2016 | Kanno et al. |
| 2018/0269521 | A1 | 9/2018 | Ohtomo et al. |

FOREIGN PATENT DOCUMENTS

| | | |
|---|---|---|
| CN | 105453324 A | 3/2016 |
| EP | 3 007 262 A1 | 4/2016 |
| JP | 2005-228570 | 8/2005 |
| JP | 2008-103096 A | 5/2008 |
| JP | 2011-129312 A | 6/2011 |
| JP | 2013-116837 | 6/2013 |
| JP | 2013-120700 A | 6/2013 |
| JP | 2013-177288 A | 9/2013 |
| KR | 10-2016-004358 A | 1/2016 |
| KR | 10-2016-0004368 A | 1/2016 |
| TW | 201405911 A | 2/2014 |
| WO | WO 2009/038037 A1 | 3/2009 |
| WO | WO 2011/118801 A1 | 9/2011 |
| WO | WO 2013/069243 A1 | 5/2013 |
| WO | WO 2013/094757 A1 | 6/2013 |
| WO | WO 2013/118723 A1 | 8/2013 |
| WO | WO 2014/112277 A1 | 7/2014 |
| WO | WO2014/196442 A1 | 12/2014 |
| WO | WO 2015/198848 A1 | 12/2015 |

OTHER PUBLICATIONS

K. Homma et al., "Crystal Structure and Phase Transitions of the Lithium Ionic Conductor $Li_3PS_4$," Solid State Ionics, 182, 53-58, (2011).

H. Yamane et al., "Crystal Structure of a Superionic Conductor, $Li_7P_3S_{11}$," Solid State Ionics, 178, 1163-1167 (2007).

R. Mercier et al., "Synthese, Structure Cristalline et Analyse Vibrationnelle de L'Hexathiohypodiphosphate de Lithium $Li_4P_2S_6$," Journal of Solid State Chemistry, 43, 151-162, (1982).

S.T. Kong et al., "Structural Characterisation of the Li Argyrodites $Li_7PS_6$ and $Li_7PSe_6$ and their Solid Solutions: Quantification of Site Preferences by MAS-NMR Spectroscopy," Chemistry—A European Journal, 16, 5138-5147, (2010).

K. Homma et al., "Crystal Structure of High-Temperature Phase of Lithium Ionic Conductor, $Li_3PS_4$," J. Phys. Soc. Jpn., 79, 90-93, (2010).

N. Kamaya et al., "A Lithium Superionic Conductor," Nature Materials, 10, 682-686, (2011).

Chinese Office Action issued in Application No. 201680044644.8 dated Jul. 16, 2019.

Notice of Allowance issued in U.S. Appl. No. 15/319,317 dated Jul. 10, 2019.

Shyue Ping Ong et al., "Phase Stability, electrochemical Stability and Ionic Conductivity of the $Li_{10\pm1}MP_2X_{12}$ (M=Ge, Si, Sn, Al or P, and X=O, S or Se) Family of Superionic Conductors", Energy & Environmental_Science, 2013, vol. 6, pp. 148-156.

Masahiro Murayama et al., "Material Design of New Lithium Ionic Conductor, Thio-LISICON, in the $Li_2S-P_2S_5$ System", Solid State Ionics, vol. 170 (2004) pp. 173-180.

\* cited by examiner

SOLID α-LITHIUM ELECTROLYTE

CROSS REFERENCE TO RELATED APPLICATIONS

This application is a national phase application of International Application No. PCT/JP2016/071066, filed Jul. 15, 2016, which claims priority to JP 2015-152634, filed Jul. 31, 2015, the content of each is incorporated herein by reference in its entirety.

TECHNICAL FIELD

The present invention relates to a lithium solid electrolyte with favorable electrochemical stability and favorable ion conductivity, a lithium battery including the solid electrolyte, and a method producing the solid electrolyte.

BACKGROUND ART

With the rapid spread of information-related and communication apparatuses such as personal computers, video cameras, and mobile phones in recent years, the development of batteries utilized as power supplies for the apparatuses has been regarded as important. The development of high-output and high-capacity batteries for electric or hybrid vehicles has also been pursued in the automobile industry and the like. Among the various batteries, lithium batteries currently attract attention from the viewpoint of having high energy densities.

In currently commercially available lithium batteries, electrolytic solutions including flammable organic solvents are used, and therefore it is preferable to attach safety devices that inhibit temperature from increasing in the event of a short circuit and to improve structures and materials for preventing a short circuit. In contrast, all-solid-state lithium batteries in which solid electrolyte layers are used instead of electrolytic solutions are considered to allow the simplification of safety devices and to be excellent in production cost and productivity because any flammable organic solvent is not used in the batteries. However, the energy densities of the all-solid-state lithium batteries are lower than those of liquid-based batteries under present circumstances.

Sulfide solid electrolyte materials are known as solid electrolyte materials used in all-solid-state lithium batteries. For example, a Li—P—S-based sulfide-based solid electrolyte has been reported (see, for example, Non Patent Literatures 1 to 5). However, the previously reported crystalline sulfides have had an ion conductivity of around $10^{-7}$ to $10^{-4}$ Scm$^{-2}$ and have been incapable of sufficiently realizing the higher energy densities of all-solid-state lithium batteries.

Non Patent Literature 6 has reported $Li_{10}GeP_2S_{12}$ (hereinafter may be referred to as "LGPS-based sulfide solid electrolyte", "LGPS", or the like) exhibiting a high ion conductivity of $12\times10^{-3}$ Scm$^{-1}$ comparable to the ion conductivity of an electrolytic solution. However, previously proposed Li—Ge—P—S-based sulfide solid electrolytes such as $Li_{10}GeP_2S_{12}$ (LGPS) reductively decompose at a potential of around 0.25 V based on lithium (vs Li/Li$^+$, hereinafter the same applies) and therefore preferably have further enhanced electrochemical stability for use of the Li—Ge—P—S-based sulfide solid electrolytes in lithium batteries.

CITATIONS LIST

Non Patent Literature

Non Patent Literature 1: K. Homma, M. Yonemura, T. Kobayashi, M. Nagao, M. Hirayama, R. Kanno, Solid State Ionics, 182, 53-58 (2011)

Non Patent Literature 2: H. Yamane, M. Shibata, Y. Shimane, T. Junke, Y. Seino, S. Adams, K. Minami, A. Hayashi, M. Tatsumisago, Solid State Ionics, 178, 1163-1167 (2007)

Non Patent Literature 3: R. Mercier, J. P. Malugani, B. Fahys, J. Douglande, G. Robert, J. Solid State Chem., 43, 151-162 (1982)

Non Patent Literature 4: S. T. Kong, O. Gun, B. Koch, H. J. Deiseroth, H. Eckert, C. Reiner, Chemistry—A European Journal, 16, 5138-5147 (2010)

Non Patent Literature 5: K. Homma, M. Yonemura, M. Nagao, M. Hirayama, R. Kanno, J. Phys. Soc. Jpn., 79, 90-93 (2010)

Non Patent Literature 6: N. Kamaya, K. Homma, Y. Yamakawa, M. Hirayama, R. Kanno, M. Yonemura, T. Kamiyama, Y. Kato, S. Hama, K. Kawamoto, A. Mitsui, Nat. Mater., 10, 682-686 (2011)

SUMMARY OF INVENTION

Technical Problem

The present invention was made in view of the above-described problems, with an object of providing a Li—P—S-based sulfide solid electrolyte material with both excellent electrochemical stability and a high lithium ion conductivity and providing a method of producing the Li—P—S-based sulfide solid electrolyte material.

Still another object of the present invention is to provide a lithium battery including the sulfide solid electrolyte material.

Solution to Problem

The following solutions to the problems described above are provided by the present invention.

[1] A sulfide solid electrolyte material including a Li element, a P element, and a S element and having peaks at positions of 2θ=17.90±0.20, 29.0±0.50, and 29.75±0.25° in powder X-ray diffraction measurement using a Cu-Kα ray having an X-ray wavelength of 1.5418 Å, wherein assuming that the diffraction intensity of the peak at 2θ=17.90±0.20 is $I_A$ and the diffraction intensity of the peak at 2θ=18.50±0.20 is $I_B$, a value of $I_B/I_A$ is less than 0.50.

[2] The sulfide solid electrolyte material according to item [1] wherein the sulfide solid electrolyte material includes a composition of $Li_{3+x+5y}P_{1-y}S_4$ (0<x≤0.6, 0<y<0.2).

[3] The sulfide solid electrolyte material according to item [1], wherein the sulfide solid electrolyte material includes a composition of $Li_{3+5y}P_{1-y}S_4$ (0<y<0.2).

[4] The sulfide solid electrolyte material according to item [1], wherein the sulfide solid electrolyte material includes a composition of $Li_{3+x}PS_4$ (0<x≤0.6).

[5] The sulfide solid electrolyte material according to item [1], wherein the sulfide solid electrolyte material includes a composition of $Li_{3+x}PS_4$ (0.1<x≤0.2).

[6] The sulfide solid electrolyte material according to any one of items [1] to [5], wherein the sulfide solid electrolyte material includes a crystal structure which includes plural $PS_4$ tetrahedra arranged so that the orientations of the apexes of the PS$_4$ tetrahedra are staggered, and in which the PS$_4$ tetrahedra do not share an edge with each other, and a ratio between a maximum axial length and a minimum axial length among lattice constants determined in diffraction measurement is 1.1 or less.

[7] A battery including a cathode active material layer including a cathode active material, an anode active material layer including an anode active material, and an electrolyte layer formed between the cathode active material layer and the anode active material layer, wherein at least one of the cathode active material layer, the anode active material layer, and the electrolyte layer includes the sulfide solid electrolyte material according to any one of items [1] to [6].

[8] A method of producing the sulfide solid electrolyte material according to any one of items [1] to [6], the method including:

a step of fragmenting a raw material composition including a component of the sulfide solid electrolyte;

an ion conductive material synthesis step of synthesizing an ion conductive material obtained by amorphizing the fragmented raw material composition by a mechanical mixing method; and a heating step of heating the amorphized ion conductive material to thereby obtain the sulfide solid electrolyte material.

Advantageous Effects of Invention

According to the present invention, there are provided: the Li—P—S-based sulfide solid electrolyte material with both excellent electrochemical stability and a high lithium ion conductivity; and the method of producing the Li—P—S-based sulfide solid electrolyte material. There is also provided the battery including the sulfide solid electrolyte material.

DESCRIPTION OF EMBODIMENTS

A sulfide solid electrolyte material of the present invention, a method of producing the sulfide solid electrolyte material, and a battery including this electrolyte material will be described in detail below. However, the present invention is not limited to embodiments described below.

First, the sulfide solid electrolyte material of the present invention will be described.

The sulfide solid electrolyte material of the present invention includes a Li element, a P element, and a S element and has peaks at positions of $2\theta=17.90\pm0.20$, $29.0\pm0.50$, and $29.75\pm0.25°$ in powder X-ray diffraction measurement using a Cu-Kα ray having an X-ray wavelength of 1.5418 Å, wherein assuming that the diffraction intensity of the peak at $2\theta=17.90\pm0.20$ is $I_A$ and the diffraction intensity of the peak at $2\theta=18.50\pm0.20$ is $I_B$, a value of $I_B/I_A$ is less than 0.50.

According to the present invention, the sulfide solid electrolyte material with favorable electrochemical stability and a favorable ion conductivity can be formed because of the high rate of a crystal phase having the characteristic peaks described above. Therefore, a battery having a high output can be obtained by using a sulfide solid electrolyte material of a first embodiment.

Figure 1:
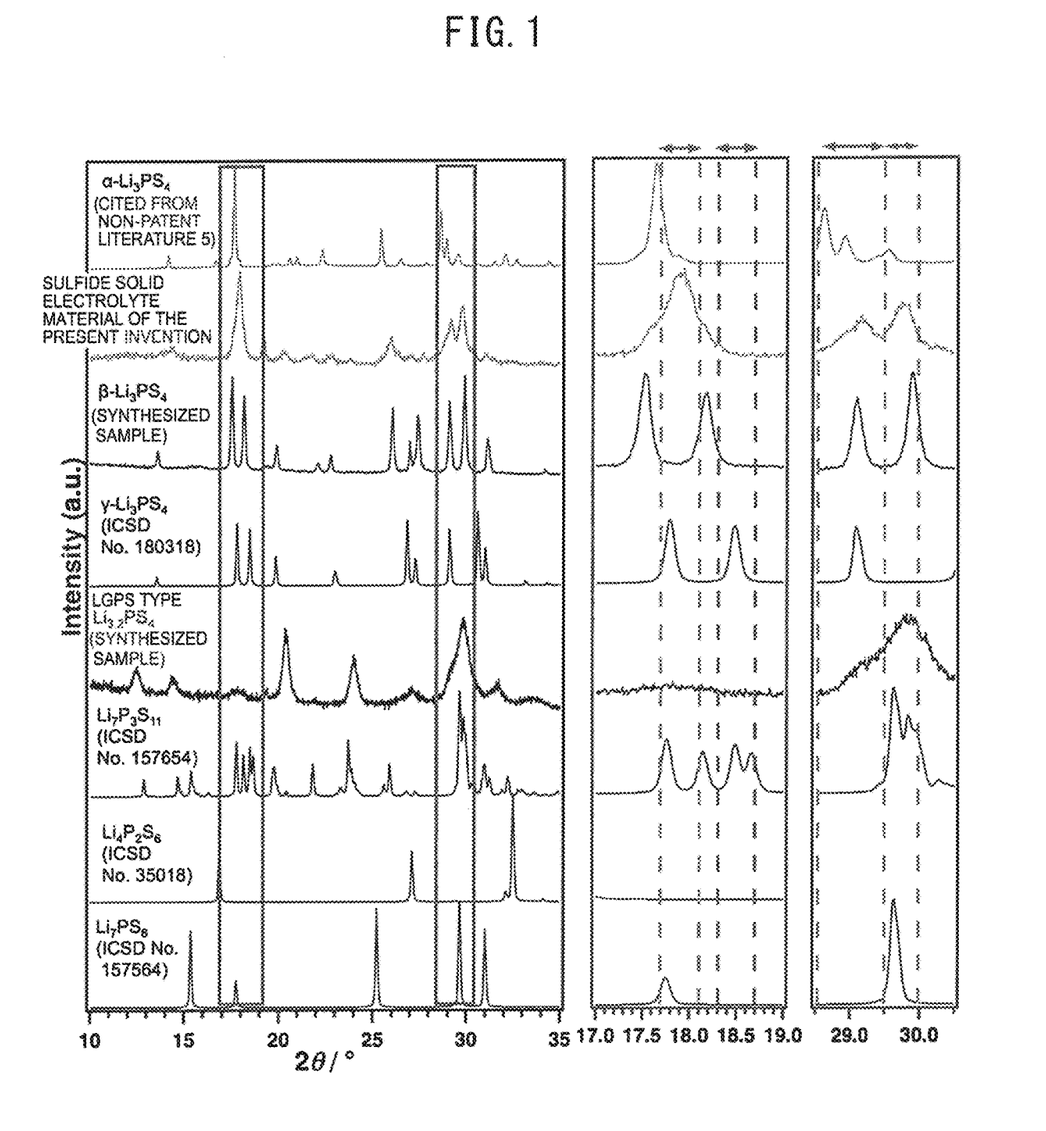
FIG. 1 illustrates the X-ray diffraction patterns of a sulfide-based solid electrolyte of the present invention and a known Li—P—S-based electrolyte.

FIG. 1 illustrates X-ray diffraction spectra for explaining differences between the sulfide solid electrolyte material of the present invention and conventional sulfide solid electrolyte materials. Each of the sulfide solid electrolyte materials in FIG. 1 has a Li—P—S-based composition. The sulfide solid electrolyte material of the present invention in FIG. 1 has peaks at positions of $2\theta=17.90\pm0.20$, $29.0\pm0.50$, and $29.75\pm0.25°$.

The conventional sulfide solid electrolyte materials obtained at room temperature in FIG. 1 have peaks different from the peaks of the electrolyte material of the present invention. The previously reported Li—P—S-based electrolytes obtained at room temperature are specifically Li$_3$PS$_4$ having a γ or β phase [Non Patent Literature 1], Li$_{3.2}$PS$_4$ having an LGPS type structure, Li$_7$P$_3$S$_{11}$ [Non Patent Literature 2], Li$_4$P$_2$S$_6$ [Non Patent Literature 3], and Li$_7$PS$_6$ [Non Patent Literature 4]. LGPS has been reported to be a superionic conductor [Non Patent Literature 6].

The peaks of the electrolyte material of the present invention is confirmed to be similar to the peaks of the α phase of Li$_3$PS$_4$ (α-Li$_3$Ps$_4$) in the X-ray diffraction patterns. The α phase of Li$_3$PS$_4$ (α-Li$_3$PS$_4$) has been reported to be the high-temperature phase of γ-Li$_3$PS$_4$, to be unable to be obtained at room temperature, and to be present as a thermodynamically stable phase at a temperature of 475° C. or more [Non Patent Literature 2]. The phases of α-AgI and Li$_2$SO$_4$ have been reported as examples of high-temperature phases thermodynamically unstable at room temperature, which may have a structure suitable for ion conduction. In addition, α-phase Li$_3$PS$_4$ is expected to have a structure that is advantageous for ion conduction.

The sulfide solid electrolyte material according to the present invention, of which the details will be described later, is produced by using means of fragmentation of a raw material and addition of an element to a basic structure (change from fixed ratio composition Li$_3$PS$_4$), and the substance having properties similar to the properties of α-Li$_3$PS$_4$ is considered to be obtained at room temperature. Therefore, the electrolyte provided in the present invention and newly synthesized at room temperature is referred to as an α type electrolyte.

In the present invention, the diffraction intensity of the peak at $2\theta=17.90\pm0.20$ is defined, the diffraction intensity of the peak at $2\theta=18.50\pm0.20$ is defined as $I_B$, and a value of $I_B/I_A$ is defined as less than 0.50, in the α type sulfide solid electrolyte material of the present invention, in order to definitely distinguish the α type sulfide solid electrolyte material from the conventional sulfide solid electrolyte materials obtained at room temperature. While not wishing to be bound by any particular theory, the peak of $I_A$ is one element of the characteristic peaks of the α type solid electrolyte material of the present invention, and a crystal structure causing the peak $I_A$ is considered to be related to ion conductivity and chemical stability. In other words, the more definite peak of $I_A$ is considered to show formation of a crystal structure superior in ion conductivity and electrochemical stability. The presence of the peak of $I_B$ (in the range of $2\theta=18.50\pm0.20$) in the relative vicinity of $I_A$ is considered to result in formation of a crystal structure causing the peak of $I_B$, relatively in inhibition of the formation of the crystal structure causing the peak of $I_A$, and in the deterioration of the ion conductivity and the electrochemical stability.

Therefore, the sulfide solid electrolyte material of the first embodiment preferably has a less value of $I_B/I_A$, and specifically, preferably 0.4 or less, more preferably 0.3 or less, more preferably 0.2 or less, and still more preferably 0.1 or less, from the viewpoint of ion conductivity and electrochemical stability. In addition, the value of $I_B/I_A$ is 0. In other words, the sulfide solid electrolyte material of the first embodiment preferably has no peak in the range of $2\theta=18.50\pm0.20$ which is the peak position of $I_B$.

Figure 2:
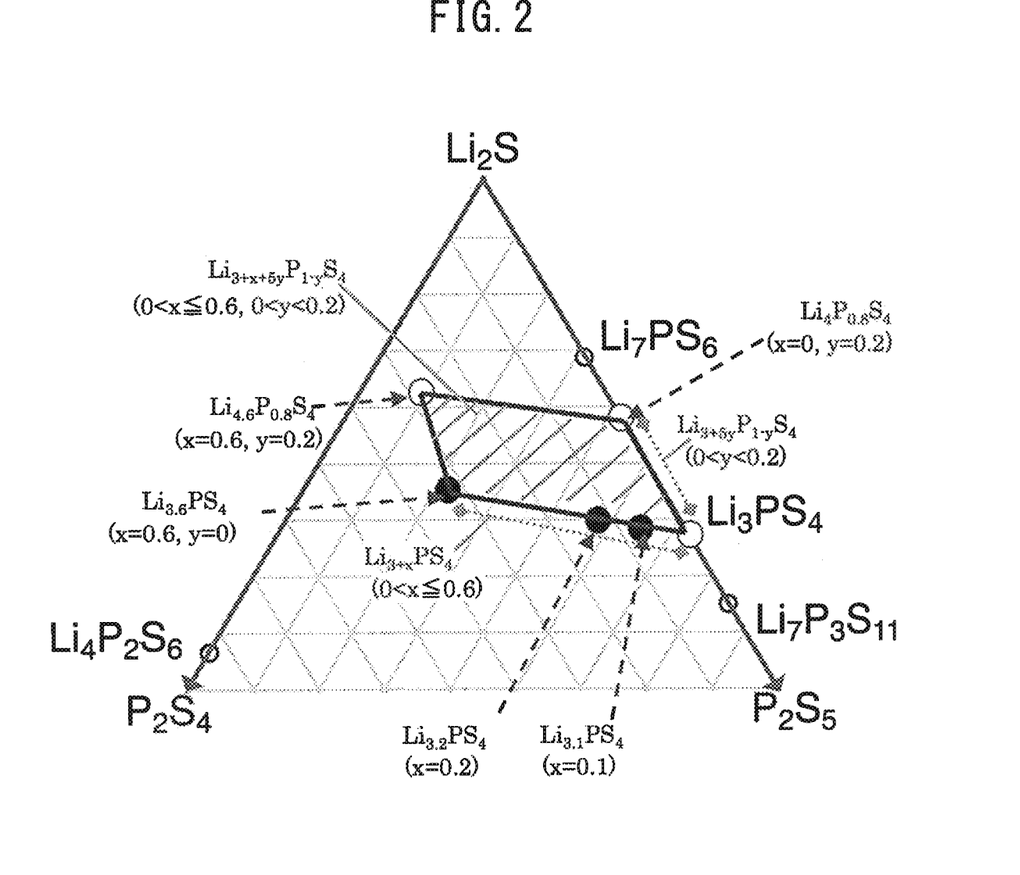
FIG. 2 is a ternary composition diagram of a Li$_2$S—P$_2$S$_4$—P$_2$S$_5$ system illustrating an example of the composition range of a sulfide-based solid electrolyte of the present invention.

The composition of a sulfide-based solid electrolyte of the present invention will be described with reference to a ternary composition diagram of a $Li_2S$—$P_2S_4$—$P_2S_5$ system of FIG. 2. The sulfide-based solid electrolyte of the present invention may include a composition of $Li_{3+x+5y}P_{1-y}S_4$ ($0<x\leq0.6$, $0<y<0.2$). The composition corresponds to the shaded area in FIG. 2. The summits of the shaded area are $Li_3PS_4$ (x=0, y=0), $Li_4P_{0.8}S_4$ (x=0, y=0.2), $Li_{4.6}P_{0.8}S_4$ (x=0.6, y=0.2), and $Li_{3.6}PS_4$ (x=0.6, y=0). However, since $0<x$, $0<y$, and $y<0.2$ (i.e., $0\neq x$, $0\neq y$, and $y\neq0.2$) are satisfied in the composition, none of the summits represented by open circles is included in the range of the composition (shaded area).

In a composition generated by γ-$Li_3PS_4$ produces, an α type electrolyte is considered to be likely to be obtained by using means such as fragmentation of a raw material in light of the similarity of the structure and composition of α-$Li_3PS_4$ (high-temperature phase) to those of γ-$Li_3PS_4$. Burning of the composition of $Li_{3+x+5y}P_{1-y}S_4$ has been confirmed to result in generation of γ-$Li_3PS_4$ in the ranges of $0<x\leq0.6$ and $0<y<0.2$. In the composition of $Li_{3+x+5y}P_{1-y}S_4$, therefore, an α type electrolyte is likely to be obtained in the ranges of $0<x\leq0.6$ and $0<y<0.2$, and a solid electrolyte having excellent ion conductivity and excellent chemical stability is obtained.

The sulfide-based solid electrolyte of the present invention may have a composition of $Li_{3+5y}P_{1-y}S_4$ ($0<y<0.2$). The composition corresponds to a composition on a line segment along the right side of the triangle of the ternary diagram in the case of x=0 in the shaded area in the ternary diagram. An increase in y along the line segment results in movement from $Li_3P_1S_4$ as a start point in a direction toward the summit $Li_2S$ of the ternary diagram. The direction is preferred because the direction tends to cause a Li component to increase and is considered to allow an α type electrolyte to be more likely to be obtained at room temperature.

The sulfide-based solid electrolyte of the present invention may have a composition of $Li_{3+x}PS_4$ ($0<x\leq0.6$). The composition corresponds to a composition on a line segment connecting $Li_3P_1S_4$ and $Li_{3.6}P_1S_4$ in the case of y=0 in the shaded area of the ternary diagram. An increase in x along the line segment results in movement from $Li_3P_1S_4$ as a start point in a direction toward $Li_{3.6}P_1S_4$. The direction is also preferred because the direction tends to cause a Li component to increase and is considered to allow an α type electrolyte to be more likely to be obtained at room temperature.

The sulfide-based solid electrolyte of the present invention may have a composition of $Li_{3-x}PS_4$ ($0.1\leq x\leq0.2$). The composition corresponds to a composition on the above-described line segment connecting $Li_3P_1S_4$ and $Li_{3.6}P_1S_4$ and to the line segment in x=0.1 to 0.2. Such a range is preferred because the range is considered to allow an α type electrolyte to be more likely to be obtained at room temperature.

The sulfide solid electrolyte material of the present invention may include a crystal structure which includes plural $PS_4$ tetrahedra arranged so that the orientations of the apexes of the $PS_4$ tetrahedra are staggered, and in which the $PS_4$ tetrahedra do not share an edge with each other, and a ratio between a maximum axial length and a minimum axial length among lattice constants determined in diffraction measurement is 1.1 or less.

Figure 3:
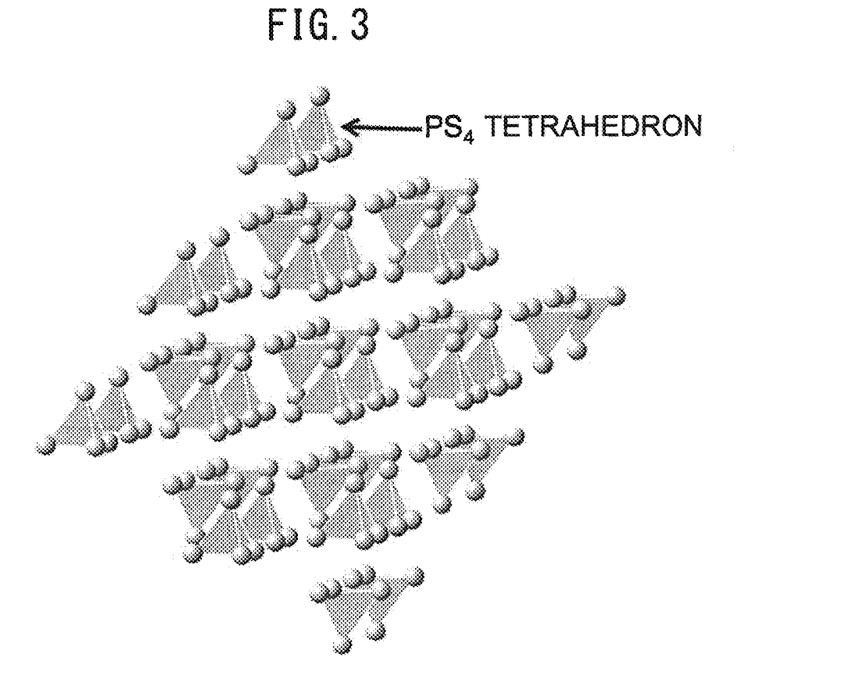
FIG. 3 is an explanatory diagram illustrating an example of a crystal structure (three-dimensional structure) of a sulfide-based solid electrolyte material of the present invention.

FIG. 3 is a perspective view for explaining an example of a crystal structure of a sulfide solid electrolyte material of the present invention. In the crystal structure illustrated in FIG. 3, each $PS_4$ tetrahedron includes P as a central element and four S elements on the summits of the tetrahedron.

Examples of the features of the structure of an α type electrolyte (structure of α-$Li_3PS_4$) include the following features.

(1) Plural $PS_4$ tetrahedra are included, and arranged so that the orientations of the apexes of the $PS_4$ tetrahedra are staggered, and the $PS_4$ tetrahedra do not share an edge with each other.

(2) A ratio between a maximum axial length and a minimum axial length of lattice constants determined in diffraction measurement (maximum/minimum) is 1.1 or less.

The features (1) and (2) are considered to have advantages for ion conduction. The feature (1) suggests that the structure has high irregularity, potential energy for ion movement is homogeneous over the structure, and the structure is in a state preferred for ion conduction. The feature (2) suggests that the structure has low anisotropy, and the anisotropy of an ion conductive path, unfavorable for ion conduction, is low. Therefore, a battery having a high output can be obtained by using the sulfide solid electrolyte material of the present invention.

Figure 4:
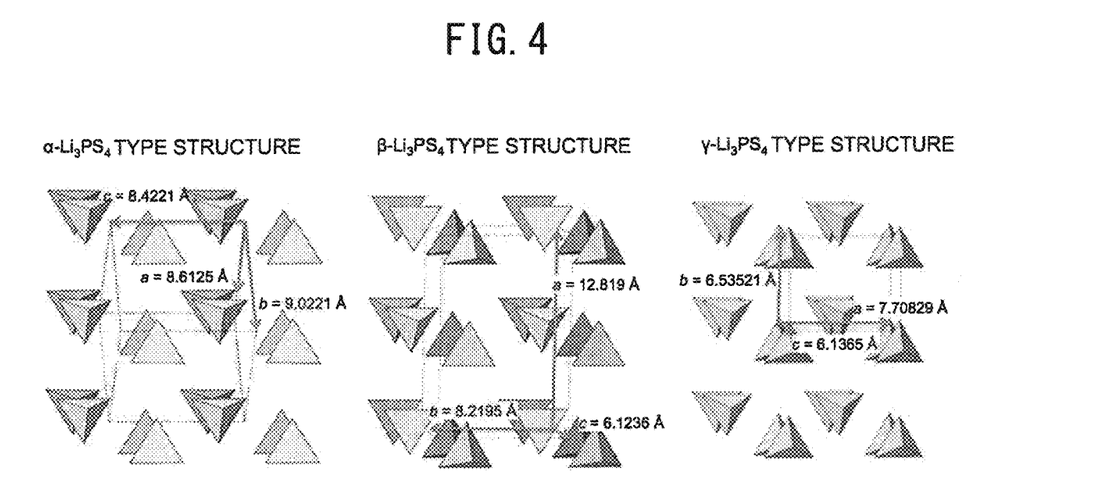
FIG. 4 is an explanatory diagram illustrating an example of the lattice constants of crystal structures of a sulfide-based solid electrolyte material of the present invention.

FIG. 4 is a perspective view for explaining an example of crystal structures as an α type structure, a β type structure and a γ type structure. In FIG. 4 also illustrating lattice constants, a ratio between a maximum axial length and a minimum axial length is determined. Only the α type structure has a ratio between a maximum axial length and a minimum axial length (maximum minimum) of 1.1 or less. In other words, in the β type structure and the γ type structure, a ratio between axial lengths of 1.1 or less is not satisfied, and therefore, the anisotropy of an ion conductive path is more than that in the α type structure, and it is suggested that the β type structure and the γ type structure are unfavorable for ion conduction.

The sulfide solid electrolyte material of the present invention is typically a crystalline sulfide solid electrolyte material. In addition, the sulfide solid electrolyte material of the present invention preferably has high ion conductivity, and the ion conductivity of the sulfide solid electrolyte material at 25° C. is preferably $9.5 \times 10^{-4}$ S/cm or more. The form of the sulfide solid electrolyte material of the present invention is not particularly limited, and examples thereof include a powder form. Further, the average particle diameter of the sulfide solid electrolyte material in a powder form is preferably within a range of, for example, 0.1 μm to 50 μm.

The sulfide solid electrolyte material of the present invention has high ion conductivity and high electrochemical stability, and can therefore be used in any applications in which ion conductivity is needed. Especially, the sulfide solid electrolyte material of the present invention is preferably used in a battery, because the sulfide solid electrolyte material can greatly contribute to stable enhancement of the output of the battery.

A method of producing a solid electrolyte of the present invention will be described. The method of producing a sulfide solid electrolyte material of the present invention includes:

a step of fragmenting a raw material composition including a component of the sulfide solid electrolyte;

an ion conductive material synthesis step of synthesizing an ion conductive material obtained by amorphizing the fragmented raw material composition by a mechanical mixing method; and a heating step of heating the amorphized ion conductive material to thereby obtain the sulfide solid electrolyte material.

The raw material composition in the present invention includes a Li element, a P element, and a S element. Examples of compounds including a Li element include sulfides of Li. Specific examples of the sulfides of Li include $Li_2S$. Examples of compounds including a P element include simple substances of P, and sulfides of P. Specific examples of the sulfides of P include $P_2S_5$ and $P_2S_4$. A compound including a S element is not particularly limited, and may be a simple substance or a sulfide. Examples of the sulfide include the sulfides including the elements described above.

The fragmentation step will be described. The fragmentation step is a step of fragmenting the raw material composition by mechanical milling to decrease the crystallinity thereof. Once the crystallinity of the crystalline raw material composition is decreased, an environment can be made in which it is easy to precipitate an α type electrolyte with high electrochemical stability and high ion conductivity (a sulfide solid electrolyte which has peaks at positions of $2\theta = 17.90 \pm 0.20$, $29.0 \pm 0.50$, and $29.75 \pm 0.25°$, and in which assuming that the diffraction intensity of the peak at $2\theta = 17.90 \pm 0.20$ is $I_A$ and the diffraction intensity of the peak at $2\theta = 18.50 \pm 0.20$ is $I_B$, a value of $I_B/I_A$ is less than 0.50). It is desirable to perform the fragmentation of the raw material composition to such an extent that a desired peak becomes sufficiently broad so that an environment is made in which it is easy to precipitate a crystal phase having the desired peak in a sulfide solid electrolyte material which is a final objective substance. The overall raw material composition may be fragmented, or only part thereof may be fragmented. In particular, the compound including a Li element is preferably fragmented. The compound including a Li element often has high crystallinity, and the precipitation of the sulfide solid electrolyte material which is a final objective substance is considered to be suppressed when the Li compound with such crystallinity remains.

The mechanical milling is a method of grinding a raw material composition while applying mechanical energy thereto. In the fragmentation step, the mechanical energy is applied to the raw material composition to fragment the raw material composition to decrease the crystallinity thereof. Examples of such mechanical milling include vibration mill, ball mill, turbo mill, mechano-fusion, and disk mill, and especially, ball mill and vibration mill are preferred.

The conditions of ball mill are not particularly limited as long as enabling a fragmented ion raw material composition to be obtained. Commonly, an increase in rotation number results in an increase in fragmentation rate, and an increase in treatment time causes fragmentation to further proceed. A weighing table rotation number in planetary ball mill is preferably, for example, within a range of 200 rpm to 700 rpm, especially, within a range of 250 rpm to 600 rpm. A treatment time in the planetary ball mill is preferably, for example, within a range of 1 hour to 100 hours, especially, within a range of 1 hour to 70 hours.

The conditions of vibration mill are not particularly limited as long as enabling an amorphized ion conductive material to be obtained. The vibrational amplitude of vibration mill is preferably, for example, within a range of 5 mm to 15 mm, especially, within a range of 6 mm to 10 mm. The vibration frequency of vibration mill is preferably, for example, within a range of 500 rpm to 2000 rpm, especially, within a range of 1000 rpm to 1800 rpm. The filling rate of a sample in vibration mill is preferably, for example, within a range of 1% by volume to 80% by volume, especially, within a range of 5% by volume to 60% by volume, particularly, within a range of 10% by volume to 50% by volume. A vibrator (for example, a vibrator made of alumina) is preferably used for vibration mill.

The ion conductive material synthesis step will be described. The ion conductive material synthesis step is a step of synthesizing an ion conductive material obtained by amorphizing the fragmented raw material composition by a mechanical mixing method.

The ion conductive material is obtained by weighing and mixing the raw material composition so that the composition of the ion conductive material is in the preferred composition range described above.

The various kinds of mechanical milling used in the fragmentation step can be used as the mechanical mixing method under similar conditions. Use of mechanical milling not only in the fragmentation step but also in the synthetic step can result in a further decrease in the crystallinity of the raw material composition, in the homogeneous mixing of the raw material composition, and in the synthesis of the amorphized ion conductive material.

The heating step will be described. The heating step is a step of heating the amorphized ion conductive material to thereby obtain the sulfide solid electrolyte material.

In the present invention, crystallinity is improved by heating the amorphized ion conductive material. The heating, enables the positive precipitation of an α type electrolyte with high electrochemical stability and high ion conductivity (a sulfide solid electrolyte which has peaks at positions of $2\theta = 17.90 \pm 0.20$, $29.0 \pm 0.50$, and $29.75 \pm 0.25°$, and in which assuming that the diffraction intensity of the peak at $2\theta = 17.90 \pm 0.20$ is $I_A$ and the diffraction intensity of the peak at $2\theta = 18.50 \pm 0.20$ is $I_B$, a value of $I_B/I_A$, is less than 0.50).

A heating temperature in the present invention is not particularly limited as long as enabling a desired sulfide solid electrolyte material to be obtained, and is preferably equal to or more than the crystallization temperature of an α type electrolyte. Specifically, the heating temperatures is preferably 200° C. or more and more preferably 240° C. or more. The heating temperature is preferably 1000° C. or less, more preferably 700° C. or less, and still more preferably 650° C. or less, still more preferably 600° C. or less, more preferably 550° C. or less, still more preferably 500° C. or less, more preferably 450° C. or less, and still more preferably 400° C. or less. The heating time is preferably adjusted as appropriate so as to obtain a desired sulfide solid electrolyte material. Further, when cooling is performed to room temperature after the heating, natural cooling may be adopted or annealing may be performed so as to obtain a desired solid electrolyte material.

It is preferable to operate the series of steps under an inert gas atmosphere such as argon in order to prevent the raw material composition and the obtained solid electrolyte material from degrading due to moisture in air.

The battery of the present invention will be described.

Figure 5:
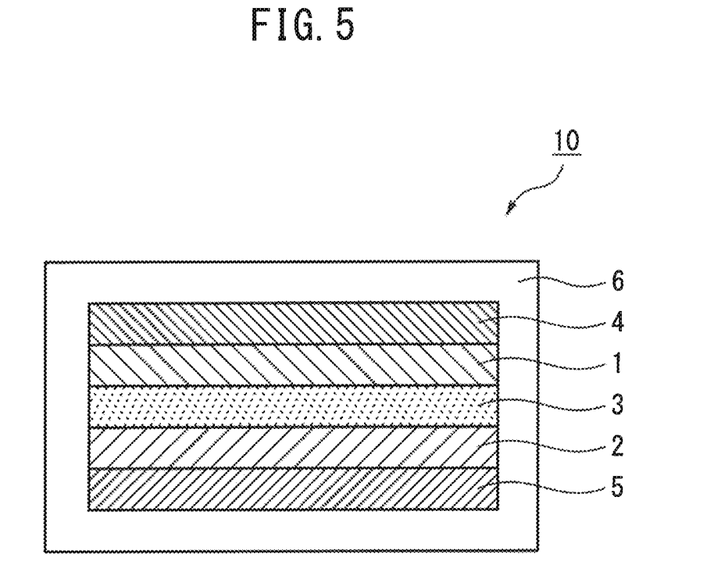
FIG. 5 is a schematic view illustrating a cross section of an example of a lithium battery of the present invention.

FIG. 5 is a schematic cross-sectional view illustrating an example of the battery of the present invention. A battery 10 in FIG. 5 is a battery including: a cathode active material layer 1 including a cathode active material; an anode active material layer 2 including an anode active material; an electrolyte layer 3 formed between the cathode active material layer 1 and the anode active material layer 2; a cathode current collector 4 that collects power from the cathode active material 1; an anode current collector 5 that collects power from the anode active material 2; and a battery case 6 housing the members. In the present invention, at least one of the cathode active material layer 1, the anode active material layer 2, and the electrolyte layer 3 includes the sulfide solid electrolyte material described above.

According to the present invention, the battery with high ion conductivity and high electrochemical stability can be formed by using the sulfide solid electrolyte material described above.

The battery of the present invention will be described below based on each configuration.

Anode Active Material Layer

The anode active material layer in the present invention is a layer including at least an anode active material and may include at least one of a solid electrolyte material, a conductivity-imparting material, and a binder, as needed. In particular, in the present invention, it is preferable that the anode active material layer includes a solid electrolyte material, which is the sulfide solid electrolyte material described above. This is because an anode active material layer with high electrochemical stability and high ion conductivity can be obtained. The rate of the sulfide solid electrolyte material included in the anode active material layer varies according to the kind of the battery and is preferably, for example, within a range of 0.1% by volume to 80% by volume, especially within a range of 1% by volume to 60% by volume, particularly within a range of 10% by volume to 50% by volume. Examples of the anode active material include a metal active material and a carbon active material. Examples of the metal active material include Li, In, Al, Si, and Sn. Examples of the carbon active material include mesocarbon microbead (MCMB), highly-orientated graphite (HOPE), hard carbon, and soft carbon.

The anode active material layer May further include a conductivity-imparting material. The conductivity of the anode active material layer can be improved by the addition of the conductivity-imparting material. Examples of the conductivity-imparting material include acetylene black, Ketjen black, and carbon fiber. The anode active material layer may also include a binder. Examples of the kind of the binder include a fluorine-containing binder ouch as polytetrafluoroethylene (PTFE). The thickness of the anode active material layer is preferably within a range of, for example, 0.1 µm to 1000 µm.

Electrolyte Layer

The electrolyte layer in the present invention is a layer formed between the cathode active material layer and the anode active material layer. The electrolyte layer is not particularly limited as long as being an layer capable of conduction of ions, and is preferably a solid electrolyte layer including a solid electrolyte material, because a battery of which the safety is higher than that of a battery using an electrolytic solution can be obtained. Further, in the present invention, the solid electrolyte layer preferably includes the sulfide solid electrolyte material described above. The rate of the sulfide solid electrolyte material included in the solid electrolyte layer is preferably within a range of, for example, 10% by volume to 100% by volume, especially within 50% by volume to 100% by volume. In particular, in the present invention, the solid electrolyte layer preferably consists of the sulfide solid electrolyte material, because a battery with high ion conductivity and high electrochemical stability can be obtained. The thickness of the solid electrolyte layer is preferably within a range of, for example, 0.1 µm to 1000 µm, especially within a range of 0.1 µm to 300 µm. Examples of a method of forming the solid electrolyte layer include a method of compression-molding a solid electrolyte material.

The electrolyte layer in the present invention may also be a layer including an electrolytic solution. In use of an electrolytic solution, a battery with a higher output can be obtained although further consideration to safety is preferred in comparison with use of a solid electrolyte layer. In such a case, at least one of the cathode active material layer and the anode active material layer typically includes the sulfide solid electrolyte material described above: The electrolytic solution typically includes a lithium salt and an organic solvent (non-aqueous solvent). Examples of the lithium salt include inorganic lithium salts such as $LiPF_6$, $LiBF_4$, $LiClO_4$, and $LiAsF_6$, and organic lithium salts such as $LiCF_3SO_3$, $LiN(CP_3SO_2)_2$, $LiN(C_2F_5SO_2)_2$, and $LiC(CF_3SO_2)_3$. Examples of the organic solvent include ethylene carbonate (EC), propylene carbonate (PC), dimethyl carbonate (DMC), diethyl carbonate (DEC), ethyl methyl carbonate (EMC), and butylene carbonate (BC).

Cathode Active Material Layer

The cathode active material layer in the present invention is a layer including at least a cathode active material and may include at least one of a solid electrolyte material, a conductivity-imparting material, and a binder, as needed. In particular, in the present invention, it is preferable that the cathode active material layer includes a solid electrolyte material, which is the sulfide solid electrolyte material described above. This is because a cathode active material layer with high ion conductivity can be obtained. The rate of the sulfide solid electrolyte material included in the cathode active material layer varies according to the kind of a battery and is preferably, for example, within a range of 0.1% by volume to 80% by volume, especially within a range of 1% by volume to 60% by volume, particularly within a range of 10% by volume to 50% by volume. Examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}Co_{1/3}Mn_{1/3}O_2$. The conductivity-imparting material and the binder used in the cathode active material layer are similar to those in the anode active material layer described above. The thickness of the cathode active material layer is preferably within a range of, for example, 0.1 µm to 1000 µm.

Other Configurations

The battery of the present invention includes at least the electrolyte layer, cathode active material layer, and anode active material layer described above. Typically, the battery further includes a cathode current collector that collects power from the cathode active material layer and an anode current collector that collects power from the anode active material layer. Examples of the material of the cathode current collector include SUS, aluminum, nickel, iron, titanium, and carbon. Examples of the material of the anode current collector include SUS, copper, nickel, and carbon. For example, the thicknesses and shapes of the cathode current collector and the anode current collector are preferably selected as appropriate depending on, for example, the application of the battery. For example, a battery case for a common battery can be used as the battery case used in the present invention. Examples of the battery case include a battery case made of SUS.

Battery

The battery of the present invention may be primary battery or a secondary battery. Especially, the battery is preferably a secondary battery, because such a secondary battery can be repeatedly charged and discharged, and is useful as, for example, a battery for automobile use. Examples of the shape of the battery of the present invention include a coin shape, a laminate shape, a cylindrical shape, and a prismatic shape. A method of producing the battery of the present invention is not particularly limited as long as enabling the battery described above to be obtained. As the method, a method similar to a method of producing a common battery can be used. For example, when the battery of the present invention is an all-solid-state battery, examples of a method of producing the battery include a method including: producing an electricity generation element by pressing in turn a material included in a cathode active material layer, a material included in a solid electrolyte layer, and a material included in an anode active material layer; housing the electricity generation element in the interior of a battery case; and crimping the battery case.

Examples

The present invention will be described in more detail below with reference to examples. The following examples are not intended to limit the present invention.

(Fragmentation of $Li_2S$)

Lithium sulfide ($Li_2S$ manufactured by NIPPON CHEMICAL INDUSTRIAL CO., LTD.) was prepared as a starting material. The powder was ground in a glove box under an argon atmosphere at room temperature for 100 hours at 600 rpm by a planetary ball mill using a Zr ball having a diameter of 2 mm. Such grinding was not performed in comparative examples. X-ray diffraction measurement of $Li_2S$ ground in such a manner noticeably showed broad diffraction peaks in comparison with untreated $Li_2S$ and $Li_2S$ ground for 6 hours at 400 rpm using a Zr ball having a diameter of 10 mm for comparison and confirmed microparticulation due to the grinding.

(Synthesis of Ion Conductive Material)

As well as lithium sulfide ($Li_2S$, manufactured by NIPPON CHEMICAL INDUSTRIAL CO., LTD.), diphosphorus pentasulfide ($P_2S_5$, manufactured by Aldrich Corporation) and red phosphorus (P, manufactured by Kojundo Chemical Laboratory Co., Ltd.) were used as starting materials. The powders were weighed and mixed to synthesize ion conductive materials by a mechanical mixing method so as to have compositions listed in Table 1. In Examples 1 to 4, mixing was performed in a planetary ball mill using a Zr ball having a diameter of 2 mm for 40 to 100 hours at 600 rpm under room temperature. Conditions such as heating at 100 to 140° C. and no mechanical mixing as listed in Table 1 were set in the comparative examples.

(Heating for Obtaining Sulfide Solid Electrolyte Material)

The obtained ion conductive material was molded in a pellet form, and the obtained pellet was put and vacuum-encapsulated in a quartz tube coated with carbon. The pressure of the quartz tube in which the pellet was vacuum-encapsulated was about 30 Pa. Then, the quartz tube was placed in a burning furnace. In the examples, the quartz tube was burnt at 240 to 280° C. for a time in a range of 2 to 4 hours. In the comparative examples, no burning was performed, or the quartz tube was burnt at 240° C. to 550° C. for a time in a range of 2 to 24 hours. Then, the quartz tube was annealed to room temperature. As a result, crystalline sulfide solid electrolyte materials having compositions listed in Table 1 were obtained.

The obtained samples were measured as follows.

(Powder X-Ray Diffraction Measurement)

Powder X-ray diffraction measurement was performed using powder X-ray diffractometers Ulima-IV (manufactured by Rigaku Corporation) and Smart Lab (manufactured by Rigaku Corporation) in order to identify crystals included in the produced sulfide solid electrolyte material samples. A Cu-Kα ray having an X-ray wavelength of 1.5418 Å was used in the powder X-ray diffraction measurement. The powder X-ray diffraction measurement was performed at diffraction angles (2θ) in a range of 10 to 100°.

(Measurement of Conductivity)

The ground sample was put in a cell for ordinary temperature, and a pressure of 70 MPa was then applied to the cell for ordinary temperature to produce a pellet. A gold powder was dispersed on both surfaces of the pellet, and a pressure of 220 MPa was applied to the pellet to form electrodes on both surfaces of the pellet and to produce a test sample. An impedance gain phase analyzer Solatron 1260 (manufactured by Solartron) was used in measurement of the conductivity of the test sample. An alternating-current impedance was measured under conditions of a measurement range of 1 Hz to 10 MHz, a measurement temperature of 25° C., an alternating voltage of 50 to 100 mV, and an integration time of 2 seconds, to measure the conductivity of the sample.

(Cyclic Voltammetry)

Electrochemical stability, also called a potential window, can be evaluated by cyclic voltammetry in an assembled cell in which a lithium ion conductive inorganic solid electrolyte and a high-molecular composite molded product are interposed between, for example, an Au foil and a lithium foil. The measurement was performed at a sweep rate of 1 mV/sec.

(Constant Current Charge and Discharge Test)

In a charge and discharge test, an interposed all-solid-state lithium battery was formed using the sulfide solid electrolyte material, obtained in Example 1, as a lithium ion conductive solid electrolyte as a separator, lithium cobaltate as a cathode active material, and metallic lithium as an anode active material. For a comparative test, an all-solid-state lithium battery was formed using $L_{10}GeP_2S_{12}$ (LGPS) as a lithium ion conductive solid electrolyte. The batteries were charged and discharged at 1/20 C (=7.25 mA/g).

[Evaluation]

(Powder X-Ray Diffraction Measurement)

Figure 6:
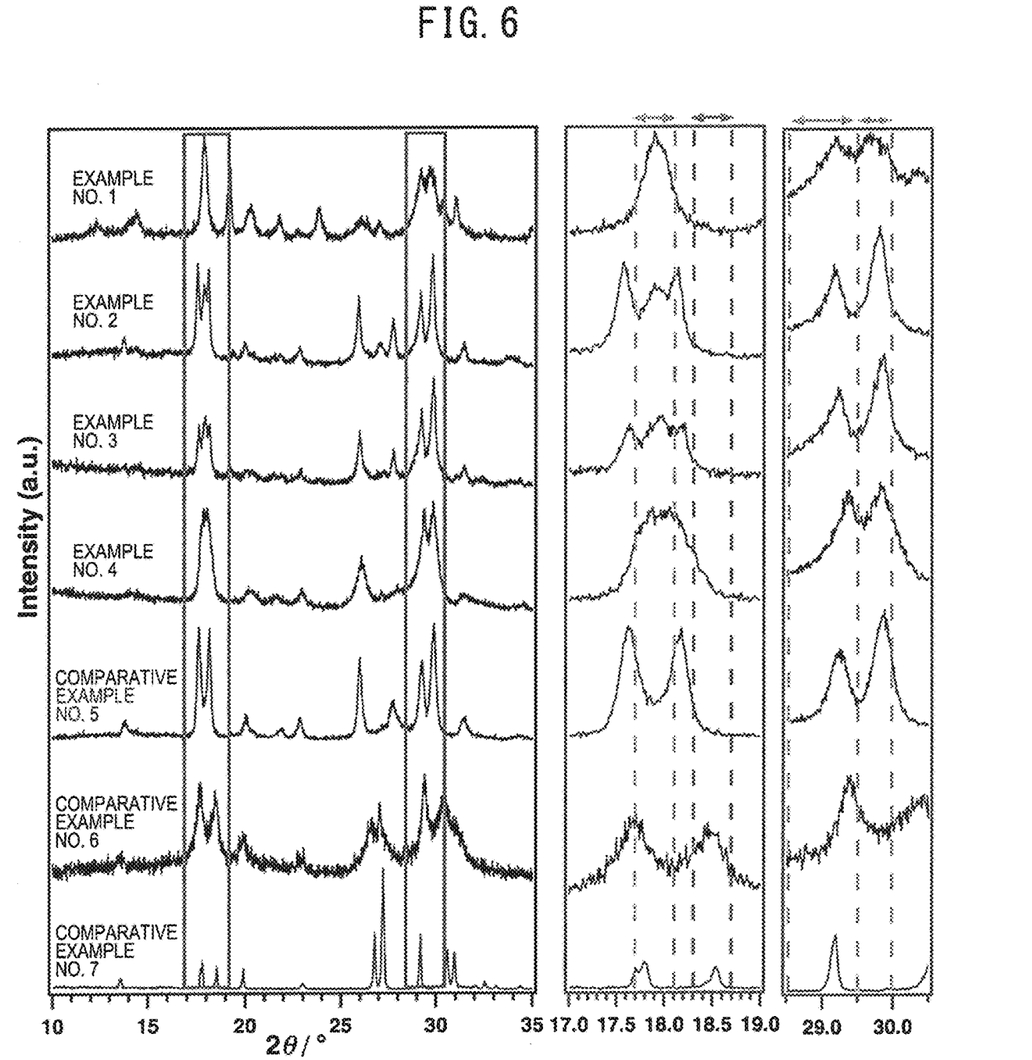
FIG. 6 illustrates the X-ray diffraction patterns of sulfide-based solid electrolytes of present invention examples and comparative examples.
Figure 7:
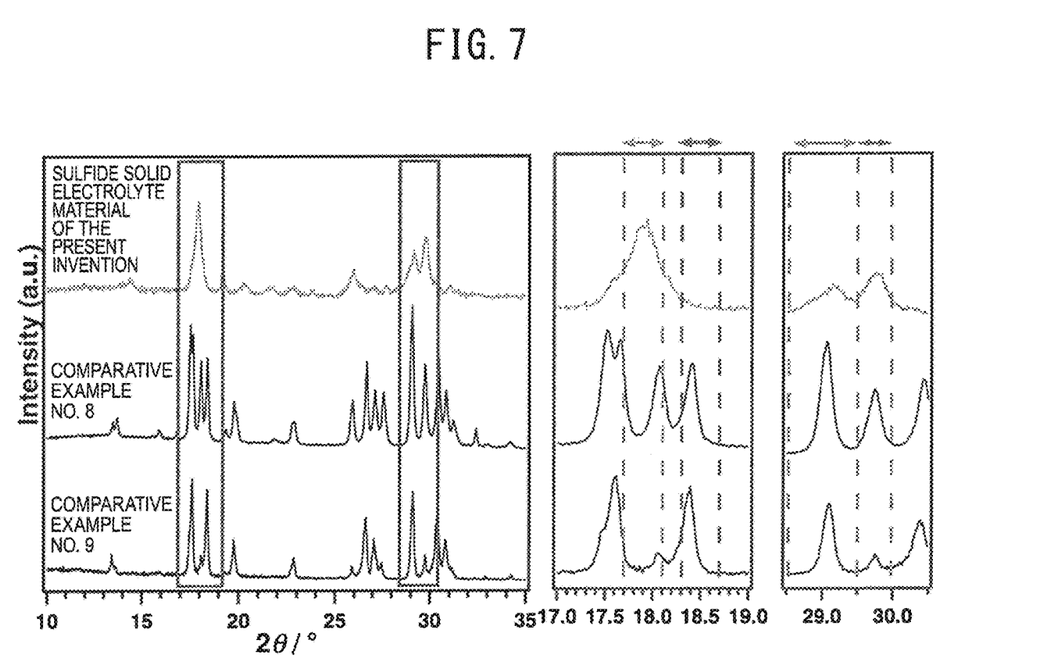
FIG. 7 illustrates the X-ray diffraction patterns of sulfide-based solid electrolytes of a reference example and comparative examples.

X-ray diffraction (XRD) measurement was performed using the sulfide solid electrolyte materials obtained in the examples and the comparative examples. The results are illustrated in FIGS. 6 and 7. As illustrated in FIG. 6, all the following peak requirements 1 to 3 are satisfied in Examples 1 to 4.

Peak requirement 1: A diffraction peak is present in a diffraction angle 2θ range of 17.90±0.20°.

Peak requirement 2: A peak is present in a diffraction angle 2θ range of 29.0±0.50, and a peak is present in a range of 29.75±0.25°.

Peak requirement 3: Assuming that the diffraction intensity of a peak at a diffraction angle 2θ=17.90±0.20 is $I_A$ and the diffraction intensity of a peak at 2θ=18.50±0.20 is $I_B$, a value of $I_B/I_A$ is less than 0.50.

The peak requirements also apply to the α phase (α-$Li_3PS_4$) of $Li_3PS_4$ (see FIG. 1), which is expected to have a structure advantageous for ion conduction. In Examples 2 and 3, a reflection peak of β-$Li_3PS_4$ is observed as a second phase. However, the examples also satisfied the peak requirements 1 to 3. Example 4 satisfied the peak requirements 1 to 3 although exhibiting less crystallinity than Example 1.

In contrast, Comparative Example 5 exhibits a peak considered to indicate β-$Li_3PS_4$ as a main phase and does not satisfy the peak requirement 1. Comparative Example 6 exhibits a peak considered to indicate a mixed phase of β-$Li_3PS_4$ and γ-$Li_3PS_4$ with low crystallinity and satisfies neither of the peak requirements 1 and 2. Comparative Example 7 exhibits a peak considered to indicate γ-$Li_3PS_4$ with high crystallinity as a main phase and does not satisfy the peak requirement 2.

The charts of Comparative Examples 8 and 9 are illustrated in FIG. 7. Comparative Examples 8 and 9 exhibit a peak considered to indicate a mixed phase of β-$Li_3PS_4$ and γ-$Li_3PS_4$ and does not satisfy the peak requirement 3 although satisfying the peak requirements 1 and 2.

(Measurement of Conductivity)

The α type sulfide solid electrolyte material ($Li_{3.15}PS_4$) obtained in Example 1 had an ionic conductivity of $9.5 \times 10^{-4}$ $Scm^{-1}$. β-$Li_3PS_4$ in Comparative Example 5 had an ionic conductivity of $2.0 \times 10^{-4}$ $Scm^{-1}$, while γ-$Li_3PS_4$ in Comparative Example 7 had an ionic conductivity of $2.0 \times 10^{-6}$ $Scm^{-1}$. It was revealed that the ion conductivity of the α type electrolyte having the composition $Li_{3.15}PS_4$ was considerably higher than those of β-$Li_3PS_4$ and γ-$Li_3PS_4$ having similar compositions.

(Cyclic Voltammetry)

Figure 8:
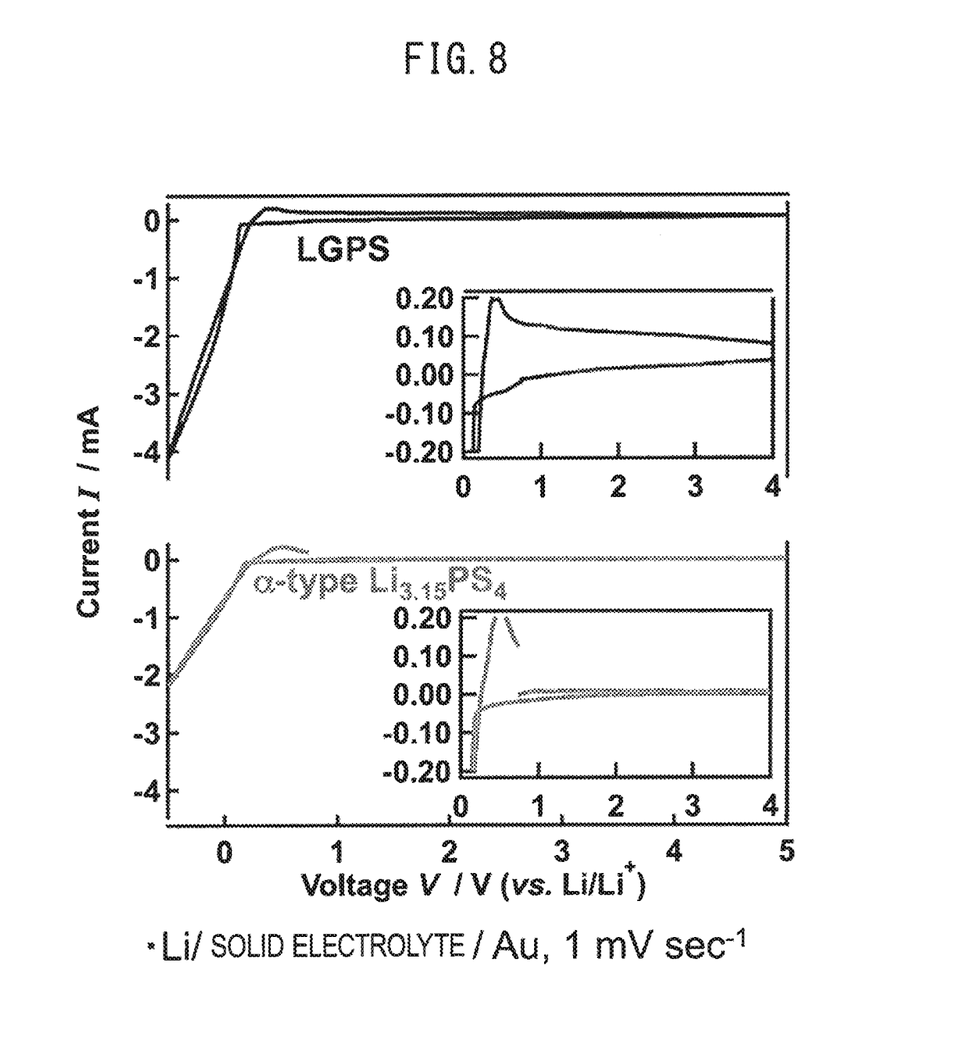
FIG. 8 illustrates the measurement results of cyclic voltammetry views of sulfide-based solid electrolytes of a present invention example and a reference example.

The CV curves of the α type sulfide solid electrolyte material ($Li_{3.15}PS_4$) obtained in Example 1 and $L_{10}GeP_2S_{12}$ (LGPS) are illustrated in FIG. 8.

The cyclic voltammetry (CV) curve of $L_{10}GeP_2S_{12}$ (LGPS) has been reported to have a wide potential window and to be electrochemically stable. The shape of the CV curve of the α type electrolyte was very similar to that of LGPS, no noticeable peak for oxidation-reduction reaction was observed in a range of 0 to 5 V, and it was suggested that the CV curve was electrochemically stable in the range.

(Constant Current Charge and Discharge Test)

Figure 9:
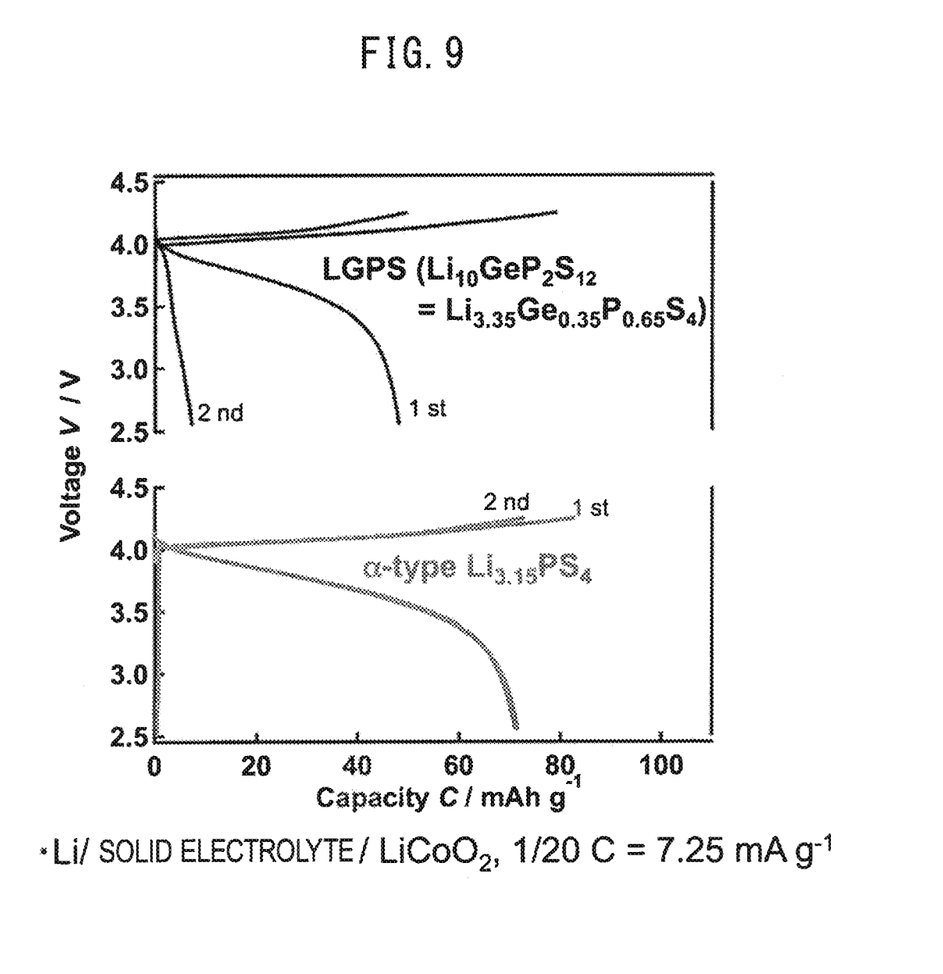
FIG. 9 illustrates the results of charge and discharge of constant current in sulfide-based solid electrolytes of a present invention example and a reference example.

In a charge and discharge test, the sulfide solid electrolyte material obtained in Example 1 and $L_{10}GeP_2S_{12}$ (LGPS) for a comparative test were used as lithium ion conductive solid electrolytes as separators. The results of the charge and discharge are illustrated in FIG. 9. When LGPS was used, a discharge capacity and a coulombic efficiency at the first cycle were 48 $mAhg^{-1}$ and 61%, respectively, and a discharge capacity and a coulombic efficiency at the second cycle were 7.05 $mAhg^{-1}$ and 14%, respectively. In contrast, when the α type electrolyte was used, a discharge capacity and a coulombic efficiency at the first cycle were 71 $mAhg^{-1}$ and 87%, respectively, and a discharge capacity and a coulombic efficiency at the second cycle were 71 $mAhg^{-1}$ and 97%, respectively. Therefore, the α type electrolyte is an electrolyte superior to LGPS reported to have high electrochemical stability, enables Li metal having the highest theoretical energy density to be used as the anode of an all-solid-state battery, and is expected to greatly contribute to the higher energy density of the all-solid-state battery.

TABLE 1

| No. | Composition | Fragmentation of $Li_2S$ | Mechanical Mixing (Ball Mill) | Heating (Burning) | Peak Requirement 1 | Peak Requirement 2 | Peak Requirement 3 | Remarks |
|---|---|---|---|---|---|---|---|---|
| 1 | $Li_{3.15}PS_4$ | Yes | 600 rpm, 40 h | 240° C., 4 h | Satisfied | Satisfied | Satisfied | Present Invention Example (α type electrolyte) |
| 2 | $Li_{3.20}PS_4$ | Yes | 600 rpm, 40 h | 280° C., 2 h | Satisfied | Satisfied | Satisfied | Present Invention Example (including β phase) |
| 3 | $Li_{3.15}PS_4$ | Yes | 600 rpm, 100 h | 260° C., 4 h | Satisfied | Satisfied | Satisfied | Present Invention Example (including β phase) |
| 4 | $Li_{1.10}PS_4$ | Yes | 600 rpm, 80 h | 240° C., 4 h | Satisfied | Satisfied | Satisfied | Present Invention Example (low crystallinity) |
| 5 | $Li_3PS_4$ | No | 100° C., 340 rpm, 20 h | 240° C., 2 h | Unsatisfied | Satisfied | Satisfied | Comparative Example (β main phase) |
| 6 | $Li_2PS_4$ | No | 140° C., 340 rpm, 20 h | No | Satisfied | Unsatisfied | Satisfied | Comparative Example (β + γ phase) |
| 7 | $Li_2PS_4$ | No | No | 450° C., 24 h | Unsatisfied | Unsatisfied | Satisfied | Comparative Example (γ main phase) |

TABLE 1-continued

| No. | Composition | Fragmentation of $Li_2S$ | Mechanical Mixing (Ball Mill) | Heating (Burning) | Peak Requirement 1 | Peak Requirement 2 | Peak Requirement 3 | Remarks |
|---|---|---|---|---|---|---|---|---|
| 8 | $Li_3PS_4$ | | X-ray diffraction pattern obtained by allowing diffraction patterns of β-$Li_3PS_4$ phase and γ-$Li_3PS_4$ phase to overlap each other on assumption that β-$Li_3PS_4$ phase and γ-$Li_3PS_4$ phase appear at molar proportion of 1:1 | | Satisfied | Satisfied | Unsatisfied | Comparative Example (β + γ phase) |
| 9 | $Li_{2.02}P_{0.35}Ge_{0.02}S_4$ | No | No (vibration mill for 30 min) | 550° C. 8 h | Satisfied | Satisfied | Unsatisfied | Comparative Example (β + γ phase) |

Peak requirement 1 A diffraction peak is present in a diffraction angle 2θ range of 17.90±0.20°.

Peak requirement 2: A peak is present in a diffraction angle 2θ range of 29.0±0.50, and a peak is present in a range of 29.75±0.25°.

Peak requirement 3: Assuming that the diffraction intensity of a peak at a diffraction angle 2θ=17.90±0.20 is $I_A$ and the diffraction intensity of a peak at 2θ=18.50±0.20 is $I_B$, a value of $I_B/I_A$ is less than 0.50.

REFERENCE SIGNS LIST

1 Cathode active material layer
2 Anode active material layer
3 Electrolyte layer
4 Cathode current collector
5 Anode current collector
6 Battery case
10 Battery

The invention claimed is:

1. A sulfide solid electrolyte material comprising a Li element, a P element, and a S element and having peaks at positions of 2θ=17.90±0.20, 29.0±0.50, and 29.75±0.25° in powder X-ray diffraction measurement using a Cu-Kα ray having an X-ray wavelength of 1.5418 Å, wherein assuming that a diffraction intensity of the peak at 2θ=17.90±0.20 is $I_A$ and a diffraction intensity of a peak at 2θ=18.50±0.20 is $I_B$, the value of $I_B/I_A$ is less than 0.50, and
wherein the sulfide solid electrolyte material comprises a composition of $Li_{3+x+5y}P_{1-y}S_4$ (0<x≤0.6, 0<y<0.2).

2. The sulfide solid electrolyte material according to claim 1, wherein the sulfide solid electrolyte material comprises a composition of $Li_{3+5y}P_{1-y}S_4$ (0<y<0.2).

3. The sulfide solid electrolyte material according to claim 1, wherein the sulfide solid electrolyte material comprises a composition of $Li_{3+x}PS_4$ (0<x≤0.6).

4. The sulfide solid electrolyte material according to claim 1, wherein the sulfide solid electrolyte material comprises a composition of $Li_{3+x}PS_4$ (0.1≤x≤0.2).

5. The sulfide solid electrolyte material according to claim 1, wherein the sulfide solid electrolyte material comprises a crystal structure which comprises a plurality of $PS_4$ tetrahedra arranged so that orientations of apexes of the $PS_4$ tetrahedra are staggered, and in which the $PS_4$ tetrahedra do not share an edge with each other, and a ratio between a maximum axial length and a minimum axial length among lattice constants determined in diffraction measurement is 1.1 or less.

6. A battery comprising a cathode active material layer comprising a cathode active material, an anode active material layer comprising an anode active material, and an electrolyte layer formed between the cathode active material layer and the anode active material layer, wherein at least one of the cathode active material layer, the anode active material layer, and the electrolyte layer comprises the sulfide solid electrolyte material according to any one of claim 1.

7. A method of producing the sulfide solid electrolyte according to claim 1, the method comprising:
a step of fragmenting a raw material composition comprising a component of the sulfide solid electrolyte;
an ion conductive material synthesis step of synthesizing an amorphized ion conductive material by mechanical-mixing the fragmented raw material composition; and
a heating step of heating the amorphized ion conductive material to thereby obtain the sulfide solid electrolyte material.

\* \* \* \* \*